United States Patent [19]

Kratochwill

[11] Patent Number: 4,751,060
[45] Date of Patent: Jun. 14, 1988

[54] EXTRACTOR

[75] Inventor: William L. Kratochwill, Blaine, Minn.

[73] Assignee: Crown Iron Works Company, Minneapolis, Minn.

[21] Appl. No.: 730,960

[22] Filed: May 6, 1985

[51] Int. Cl.⁴ .............................................. B01D 11/02
[52] U.S. Cl. ...................................... 422/268; 201/32; 202/118; 198/606; 198/607; 209/173
[58] Field of Search ................ 209/173; 198/606, 607; 134/67, 68, 70, 73; 210/255, 511; 422/267, 268; 201/32; 202/118; 208/8 LE; 196/11 LE, 14.52

[56] References Cited

U.S. PATENT DOCUMENTS

| | | | |
|---|---|---|---|
| 448,895 | 3/1891 | Kannel | 134/67 |
| 1,561,043 | 11/1925 | Zuckerman | 134/67 |
| 1,705,544 | 3/1929 | Schmidt | 134/68 |
| 2,227,605 | 1/1941 | Swallen et al. | 422/268 |
| 3,565,587 | 2/1971 | Graf, Jr. | 422/268 |

Primary Examiner—Michael S. Marcus
Attorney, Agent, or Firm—Lawrence M. Nawrocki

[57] ABSTRACT

The present invention is an improved extractor (10) for removing a liquid from a solid carrier medium in which the liquid is entrained. The extraction process is accomplished by utilizing both percolation and immersion removal methods. The extractor (10) includes a plurality of pools (12, 12') through which the solid entraining the liquid therein is moved in a direction counter-flow to that in which a solvent passes through the extractor (10). Percolation removal is effected at the overflow (48, 48') of each pool (12, 12') as solvent washes through the solids being processed. Immersion is effected at the lower end of a sloped floor (22, 22') of each pool (12, 12') where the solids are soaked in the solvent. A final percolation bath (14) can be provided as a last stage of the extractor (10).

10 Claims, 1 Drawing Sheet

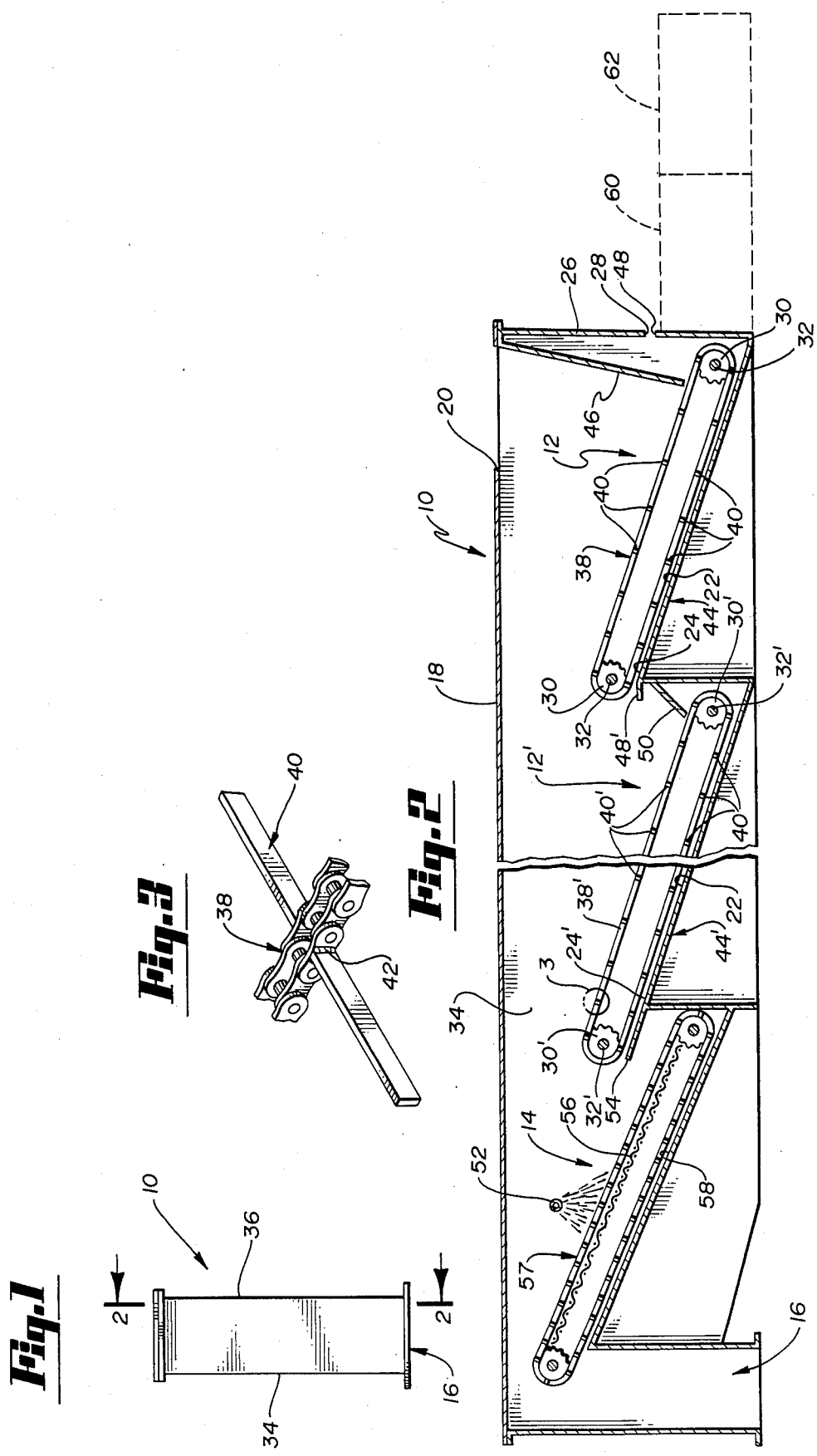

EXTRACTOR

TECHNICAL FIELD

The present invention is related to the field of equipments for extracting a liquid from a solid carrier medium in which the liquid is entrained. Such equipments utilize a solvent for treating the liquid entraining solid carrier medium in order to extract the liquid. Methods utilizing these equipments perform extraction basically in one of two ways: percolation and immersion. A preferred embodiment of the present invention operates utilizing both of these methods.

BACKGROUND OF THE INVENTION

Numerous industrial applications exist for methods by which normally liquid substances entrained within solids are removed therefrom and recovered. For example, various methods and equipments are employed to remove oils from cereals and meals to recover the oils therefrom.

Another application is the treatment of tar sands in order to remove a liquid petroleum by-product from solid granulate entraining the by-product. Tar sand deposits are located at numerous locations around the world, and a number of deposits are located on the North American continent. These locations are primarily in the states of California, Kentucky, Oklahoma, Texas, and Utah of the United States and at various locations in Canada.

Recovery of the petroleum products embedded in such sands is, at present, a difficult and expensive proposition. At the present cost of petroleum, therefore, recovery of petroleum from these deposits is impracticable. As the cost of crude oil rises, however, the viability of extraction of by-products from tar sands will increase.

As can be seen from the two illustrations identified above, the particular products being worked in extraction processes can vary quite significantly. In the case of cereals and meals, the solid carrier is fairly homogenously granular. In the case of tar sand processing, however, because of the nature of the solid and, even more significantly, the viscosity of the liquid by-product to be recovered, the consistency of the product being worked tends to be clumpy, the size of agglomerations varying significantly. Even more importantly, however, the distribution of the petroleum product throughout the tar sand mass is not uniform, and what might prove to be sufficient processing for a portion of the mass might prove inadequate for other portions.

Because of the significant difference between the types of products that are subjected to extraction processes, the equipments appropriate for handling one product might tend to be very unsuitable for handling another. Percolation, a method wherein the solvent flows through the extractable material, might function well to remove oils from meal because of the relatively uniform granularity of the meal. With tar sands, however, percolation is difficult because of the compactness of the raw product to be processed. Nevertheless, percolation, if it can be performed, is a method of extraction which provides advantages in extracting the liquid by-product from its solid carrier.

Various devices and apparatus have been developed for processing heavy sedimentary solids having a liquid entrained therein. Because of the difficulty in handling such products, however, various problems go unsolved. For example, in view of the sludginess of the product being processed, bogging down and even complete clogging of machinery can easily occur. Various of the prior art structures incorporate numerous moving parts which are exposed to the sediment, and, consequently, clogging is facilitated.

It is to the desirable features and undesirable problems discussed above that the present invention is directed. It is an improved extractor which functions well to process heavy sedimentary, liquid-entraining solids to remove and recover the liquid by-products entrained in those solids. Although particularly useful for processing tar sand deposit materials to recover petroleum products embedded in such sands, it will be understood that the invention is designed to function equally as well in processing other heavy sedimentary solids.

SUMMARY OF THE INVENTION

The present invention is an extractor for separating liquids embedded in heavy sedimentary solids from the solid carrier medium. It includes a plurality of pools arranged relative to one another so that a liquid solvent introduced into the uppermost of the pools will cascade successively into subsequently lower pools. Means are provided for introducing a solvent agent into an uppermost of the pools. The solvent overflows through an outlet end of the uppermost pool and into an inlet end of the next lower pool. The solvent, in turn, overflows through an outlet end of that pool into the inlet end of the next successive pool. Means are provided for depositing raw, liquid-entraining, solid carrier medium into the lowermost of the pools and for conveying the solid medium upwardly along a floor of each pool which slopes downwardly from the inlet end of the pool to the outlet end. The solid medium is, thereby, conveyed upwardly into the next subsequently higher pool.

Each pool can be constructed with an inlet at the inlet end being spaced vertically above an overflow at the outlet end. The floor of the pool can have its upper end at the inlet to the pool and its lower end spaced vertically downwardly from the overflow.

By utilizing such a construction, a solvent introduced into the uppermost pool will rise to a level at the overflow of that pool. Simultaneously, sedimentary solids entraining the liquid to be extracted are being conveyed counter-current into the upper pool from the immediately lower pool. As solvent passes over the uppermost pool's overflow, percolation will occur with respect to the solids entering the uppermost pool. As those solids are deposited onto the lower end of the floor of the uppermost pool, they will be submerged beneath the solvent in the pool, and immersion extraction will occur.

A preferred embodiment of the invention includes a bath, constructed similarly to each of the pools, and disposed above the uppermost pool. As in the case of transmission of the sedimentary solids upwardly through the pools, the solids can be deposited from the uppermost pool into the bath. The bath can be provided with a transmission means for passing the solids beneath sprinkler introduction of the solvent into the bath to effect a final percolation extraction stage upon the solids before they are recovered.

The present invention is thus an improved extractor apparatus. Additional features of the invention and advantages obtained in view of those features will become more apparent with reference to the DE- TAILED DESCRIPTION OF THE INVENTION, appended claims, and accompanying drawing figures.

BRIEF DESCRIPTION OF THE DRAWING

FIG. 1 is an end elevational view of an extractor in accordance with the present invention;

FIG. 2 is a side sectional view taken generally along the line 2—2 of FIG. 1; and FIG. 3 is a perspective view of a conveyer stave attached to a section of an endless chain used in conveying sedimentary solids through the extractor in a direction counter-flow to the direction of movement of the solvent.

DETAILED DESCRIPTION OF THE INVENTION

Referring now to the drawing wherein like reference numerals denote like elements throughout the several views, FIG. 1 illustrates an end view of an extractor 10 in accordance with the present invention. The view illustrates an end at which solids, from which an extractable liquid entrained therein have been removed, are recovered from the extraction process. As seen in the view, a preferred embodiment of the invention envisions an extractor 10 relatively narrow as compared to the height dimension. As can be seen in referring, further, to FIG. 2, the width of the extractor 10 is even smaller relative to its length.

Referring now to FIG. 2, the extractor 10 is divided, along its longitudinal axis, into a plurality of pools 12, 12' and, in a preferred embodiment, a final stage bath 14. A chute 16 extends downwardly from a leftmost end of the final bath 14, and solid materials having gone through the extraction process are deposited into the chute 16 for recovery.

FIG. 2 illustrates a cover 18 superimposed over the extractor 10, although it will be understood that, if desired, the extractor 10 could be open on its top. When a cover 18 is used, however, an aperture 20 is provided therein to afford entry into the extractor 10 to sedimentary solids having an extractable liquid entrained therein. One of a number of types of equipments (not shown) known in the art can be utilized for conducting the sedimentary solids to the aperture 20 and dumping them therethrough. Such equipments might typically include augers or other components to effect movement of the solids.

Solids deposited through the aperture 20 settle into a first, lowermost pool 12 of the extractor 10. The pool 12 has an inclined floor 22 which angles upwardly and to the left as seen in FIG. 2. The uppermost end of the floor 22 is at a height the same as is the inlet 24 end (that is, the leftmost end) of the pool 12. The floor 22 of the pool 12, thereafter, slopes downwardly until it intersects a wall 26 of the extractor 10 at the end at which the sedimentary solids are introduced. A discharge aperture 28 is provided in that wall 26 at a height lower than the inlet end 24 of the pool.

A pair of sprockets 30 are mounted on axles 32 which are journaled between the side walls 34, 36 of the extractor 10, one of each of said sprockets 30 proximate each end of the pool 12. An endless chain 38 extends around the sprockets 30 and is driven by the sprockets 30 in a clockwise direction as viewed in the figure. A plurality of staves 40 extend generally transversely to a plane defined by the run of the chain 38, a portion of each stave 40 extending laterally from the chain 38 in opposite directions, when the chain 38 is positioned centrally between the walls 34, 36 of the extractor 10, substantially to its respective side wall 34, 36. The stave portions can be welded to chain lengths 38 as at 42 as seen in FIG. 3. With the staves 40 so secured to the chain length 38, they will not impede passage of the chain 38 over the drive sprockets 30.

It will be understood that a single chain 38 having stave portions extending on both sides thereof is not an exclusive manner of conducting sedimentary solids along the floor 22 of a pool 12. Dual chains, one running substantially along each side wall 34, 36 of the extractor 10 can also function to effect the intended purpose of the chain/stave conveyor assembly. When such dual chains would be used, each stave would comprise a single portion extending across between the chains. A single chain and accompanying pair of drive sprockets, however, is believed to be optimum in order to minimize the number of moving parts which might become clogged by the solids being processed.

With the conveyor construction illustrated and described, it can be seen that solids deposited through the aperture 20 will pass through the conveyor and come to rest on the floor 22 of the pool 12. Because of the presence of the staves 40 and a clockwise rotation of the chain 38, the solids will be moved upwardly along the inclined floor 22 of the pool 12 to the inlet end 44 thereof. In order to direct solids away from the lower drive sprocket 30 of the conveyor, a baffle 46 can be provided extending downwardly from the aperture 20 and angled away from the extractor wall 26.

The second lowermost pool 12' has an overflow 48' substantially coinciding with the inlet 44 to the lowermost pool 12. Solids moved through the lowermost pool 12, therefore, will be deposited into this second pool 12'. The construction of this pool 12' is substantially identical to that of the lowermost pool 12.

The specific construction of baffles provided in order to direct solids away from the lower of conveyor drive sprockets 30', however, is different because of the smaller vertical distance through which the solids will tumble down to the floor 22' of the pool 12'. The angle of the baffle 50 relative to the vertical is greater in this second pool 12'. The angle of the floor 22' of the pool 12', the floor's length, and the construction of the chain conveyer with its staves 40' can be, however, the same as in the lowermost pool 12. As in the case of the lowermost pool 12, the direction of rotation of the conveyor is clockwise as viewed in FIG. 2 and, consequently, sedimentary solids deposited on the floor 22' of the pool 12' will be moved upwardly therealong by the conveyor.

It will be understood that, although only two pools 12, 12' are illustrated in FIG. 2, any number might be incorporated depending upon the difficulty of extraction with the particular solid involved, the degree of quality of extraction desired, and other factors.

A liquid solvent is introduced into the uppermost pool 12' to flow in a direction counter-current to the direction of movement of the sedimentary solids through the extractor 10. As will be discussed hereinafter, the solvent can be introduced through a sprinkler arrangement 52 into a final bath 14 through which the solids can pass. When the method of provision of the liquid solvent is in accordance with such a preferred embodiment, the solvent will be introduced into the uppermost pool 12' by passing over an overflow 54 at the output end of the bath 14 and into the uppermost pool 12'. As solvent is so introduced into the uppermost pool 12′, it will wash through solids passing upwardly along the floor 22′ of that pool 12′ and proximate the inlet end 44′ thereof. At such a location, percolation extraction will be effected.

As the solvent continues to pass over the overflow 54 from the bath 14, it will cascade into the uppermost pool 12′ and tend to fill that pool 12′ until it reaches a level therein of the overflow 48′ from the pool 12′. Solids on the floor 22′ of the pool 12′beneath the level of solvent will be subjected to immersion extraction.

As the level of solvent in the uppermost pool 12′ arrives at the overflow 48′therefrom, the solvent will, in turn, cascade into the next lower pool 12. Again, percolation extraction of the liquid entrained in the sedimentary solids will be occasioned at that location, as will immersion extraction be occasioned upon the solids below the level of solvent within the pool 12 as the level rises therein. Such a combination of percolation and immersion extraction will occur in each of the pools 12, 12′ within the extractor 10.

As previously indicated, a final bath 14 through which the solids will pass can be provided at a level above that of the uppermost pool 12′. A floor 56 over which the solids are transmitted can be provided at a location elevated above the floor 58 of the bath 14. A conveyor 57 similar in construction to those utilized in the various pools 12, 12′ can be provided in the bath 14. The rotation of the conveyor 57, however, would be counter-clockwise as viewed in FIG. 2, the upper run of the conveyor 57 moving across the elevated floor 56. The elevated floor 56 can be porous so that solvent sprinkled over solids passing up the elevated floor 57 will pass through the elevated floor 57 and fill the bath 14 to a level of its overflow 54. As previously discussed, the solvent will, thereafter, cascade into the uppermost pool 12′ and, sequentially, into the other pools 12. The final bath 14 stage of extraction is one of percolation since the solvent washes through the sedimentary solids passing up the elevated floor 57 of the bath 14.

If desired, the extractor 10 can incorporate a tank 60 for receiving miscella (that is, a solution of the solvent and extracted liquid) once it passes out of the terminal wall 26 of the lowermost pool 12. Similarly, the miscella can, thereafter, be worked to recover the liquid extract therefrom. Appropriate equipment 62 can be used in combination with the extractor 10 to effect this separation.

Numerous characteristics and advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. An extractor for removing a liquid by-product from a solid carrier medium entraining the liquid therein, comprising:
   (a) means defining a plurality of serially connected cascading pools, each pool means having an inlet end, and outlet end, a floor sloping downwardly from said inlet end to said outlet end, and a weir overflow at said outlet end disposed at a height below that of an end of said floor at said inlet end;
   (b) means for introducing a solvent into an uppermost of said pool means, wherein solvent so introduced successively overflows into subsequently lower pool means;
   (c) means for depositing raw, liquid-entraining, solid carrier medium into a lowermost of said pool means; and
   (d) means for conveying the carrier medium upwardly along a floor of each pool means and into a next subsequently higher pool means;
   (e) wherein solvent in each of said pool means is maintained at a level below an end of a floor at said inlet end of a respective pool means so that, as the carrier medium is conveyed upwardly along a floor, the liquid by-product is removed by immersion extraction while the carrier medium is below the solvent level in the pool means, and by percolation extraction as it continues to be conveyed upwardly along the floor after it has risen above the solvent level.

2. An extractor in accordance with claim 1 further comprising means for removing a solution of solvent and liquid extract from said lowermost pool means.

3. An extractor in acordance with claim 2 further comprising means for processing said solution to recover said liquid extract therefrom.

4. An extractor in accordance with claim 1 further comprising bath means disposed elevated with respect to said uppermost pool means, said bath means having a solvent sprinkler, porous transmission means under said sprinkler, and a weir overflow over which solvent in said bath means cascades into said uppermost pool means, and wherein said extractor further includes means for conveying the carrier medium upwardly along a floor of said uppermost pool means, over said weir overflow of said bath means, and onto said porous transmission means.

5. An extractor in accordance with claim 4 further comprising means for eliminating the solid carrier medium from said bath means.

6. An extractor in accordance with claim 4 wherein each of said pool means further comprises a pair of lateral walls and each of said conveying means comprises:
   (a) a pair of sprockets, a first mounted proximate said inlet end of a pool means along the floor of which said conveying means conveys the carrier medium, and a second mounted proximate said outlet end of said pool means;
   (b) an endless chain extending about said sprockets, a lower run of said chain lying closely proximate the floor of said pool means, said chain including a plurality of staves spaced longitudinally along said chain and protruding laterally substantially to said lateral walls; and
   (c) means for driving said chain so that said lower run thereof moves upwardly along said floor.

7. An extractor in accordance with claim 6 wherein said endless chain is disposed generally parallel to, and centrally between, said lateral walls.

8. An extractor in accordance with claim 1 wherein each of said pool means further comprises a pair of lateral walls and each of said conveying means comprises:
   (a) a pair of sprockets, a first mounted proximate said inlet end of a pool means along the floor of which said conveying means conveys the carrier medium, and a second mounted proximate said outlet end of said pool means;

(b) an endless chain extending about said sprockets, a lower run of said chain lying closely proximate the floor of said pool means, said chain including a plurality of staves spaced longitudinally along said chain and protruding laterally substantially to said lateral walls; and (c) means for driving said chain so that said lower run thereof moves upwardly along said floor.

9. An extractor in accordance with claim 8 wherein said endless chain is disposed generally parallel to, and centrally between said lateral walls.

10. An extractor for removing a liquid by-product from a solid carrier medium entraining the liquid therein by performing percolation and immersion extraction methods upon the medium, comprising:

(a) means defining a plurality of serially connected cascading pools, each pool means having an inlet end, an outlet end, and a floor sloping downwardly from said inlet end to said outlet end, and a weir overflow at said outlet end disposed at a height below that of an end of said floor at said inlet end;

(b) bath means serially connected to an uppermost of said pool means, said bath means being elevated with respect to said uppermost of said pool means and having a floor, porous transmission means overlying said floor, and a weir overflow over which liquid in said bath means cascades into said uppermost pool means, said bath means weir overflow being at a height above that of said weir overflow of said uppermost pool means;

(c) a solvent sprinkler disposed above said transmission means for introducing a solvent into said bath means above said transmission means, wherein solvent so introduced successively flows into said uppermost pool means and, subsequently, into lower pool means;

(d) means for depositing raw, liquid-entraining, solid carrier medium into a lowermost of said pool means; and (e) means for conveying the carrier medium upwardly along a floor of each pool means and into a next subsequently higher pool means, and along said floor of said uppermost pool means and onto said transmission means;

(f) wherein solvent in each of said pool means is maintained at a level below an end of a floor at said inlet end of a respective pool means so that, as the carrier medium is conveyed upwardly along a floor, the liquid by-product is removed by immersion extraction while the carrier medium is below the solvent level in the pool means, and by percolation extraction as it continues to be conveyed upwardly along the floor after it has risen above the solvent level.

* * * * *